United States Patent
Tamegai et al.

(10) Patent No.: US 7,894,717 B2
(45) Date of Patent: Feb. 22, 2011

(54) CONTROL CIRCUIT FOR SELF EXCITING DC/DC CONVERTER

(75) Inventors: Yoichi Tamegai, Kyoto (JP); Satoru Nate, Kyoto (JP); Isao Yamamoto, Kyoto (JP)

(73) Assignee: Rohm Co., Ltd. (JP)

( * ) Notice: Subject to any disclaimer, the term of this patent is extended or adjusted under 35 U.S.C. 154(b) by 282 days.

(21) Appl. No.: 12/096,803

(22) PCT Filed: Dec. 6, 2006

(86) PCT No.: PCT/JP2006/324333

§ 371 (c)(1),
(2), (4) Date: Jun. 10, 2008

(87) PCT Pub. No.: WO2007/069508

PCT Pub. Date: Jun. 21, 2007

(65) Prior Publication Data

US 2009/0129768 A1    May 21, 2009

(30) Foreign Application Priority Data

Dec. 14, 2005  (JP) .............................. 2005-360013

(51) Int. Cl.
G03B 7/26 (2006.01)
(52) U.S. Cl. ..................................................... 396/206
(58) Field of Classification Search ................. 396/206; 320/166
See application file for complete search history.

(56) References Cited

U.S. PATENT DOCUMENTS

| | | | |
|---|---|---|---|
| 4,630,916 A * | 12/1986 | Ishiguro et al. ............ | 396/206 |
| 6,255,895 B1 * | 7/2001 | Kim et al. .................... | 327/530 |
| 2005/0237032 A1 * | 10/2005 | Tan et al. ..................... | 320/166 |

FOREIGN PATENT DOCUMENTS

| JP | 06-151081 A | 5/1994 |
|---|---|---|
| JP | 2001-197723 A | 7/2001 |
| JP | 2002-369501 A | 12/2002 |
| JP | 2003-033021 A | 1/2003 |
| JP | 2004-201474 A | 7/2004 |
| JP | 2005-073483 A | 3/2005 |
| JP | 2005-312291 A | 11/2005 |

OTHER PUBLICATIONS

International Preliminary Report on Patentability for International Patent Application No. PCT/JP2006/324333; Issued Jun. 18, 2008 with English Translation.
International Search Report for International Patent Application No. PCT/JP2006/324333; Mailed Jan. 9, 2007 with English Translation.

* cited by examiner

*Primary Examiner*—Christopher E Mahoney
*Assistant Examiner*—Noam Reisner
(74) *Attorney, Agent, or Firm*—Cantor Colburn LLP

(57) ABSTRACT

A switching transistor is connected to the primary coil of a transformer. A first resistor is provided such that one end thereof is connected to the switching transistor, and the other end thereof is grounded. A first voltage comparator compares a first detection voltage with a first threshold voltage. A second voltage comparator compares a second detection voltage with a second threshold voltage. A switching control unit controls the ON/OFF state of the switching transistor according to the output signals of the first voltage comparator and the second voltage comparator. A first electrode pad through a fourth electrode pad are provided to the respective nodes of the switching transistor and the first resistor.

7 Claims, 6 Drawing Sheets

30a

CONTROL CIRCUIT FOR SELF EXCITING DC/DC CONVERTER

CROSS REFERENCE TO RELATED APPLICATIONS

This is a U.S. national stage of application No. PCT/JP2006/324333, filed on 6 Dec. 2006. Priority under 35 U.S.C. §119(a) and 35 U.S.C. §365(b) is claimed from Japanese Application No. 2005-360013, filed 14 Dec. 2005, the disclosure of which is also incorporated herein by reference.

BACKGROUND OF THE INVENTION

1. Field of the Invention

The present invention relates to a switching power supply, and particularly to a control circuit for a self-exciting DC/DC converter.

2. Description of the Related Art

For the purpose of generating higher voltage than the input voltage, step-up switching power supplies are widely used in various electronic devices. Such a step-up switching power supply includes a switching element and an inductor or a transformer. With such an arrangement, the switching element is alternately turned on and off in a time division manner so as to generate back electromotive force in the inductor or the transformer, thereby boosting the input voltage, i.e., thereby outputting voltage that has been stepped up.

With an insulated DC/DC converter, when a switching transistor is turned on, an electrical current flows through the primary winding of the transformer, thereby storing energy in the transformer. Then, when the switching transistor is turned off, the energy thus stored in the transformer is transferred as a charging current from the secondary winding of the transformer to an output capacitor via a rectifier diode, thereby generating output voltage that has been stepped up. After the energy stored in the transformer has been transferred to the output capacitor, the current that flows through the rectifier diode becomes zero.

A self-exciting DC/DC converter, which is a kind of insulated DC/DC converter, is known, which has a configuration that does not involve an oscillator, and which has a function in which the primary winding or the secondary winding of a transformer is monitored, and on/off control is performed for the switching transistor according to the state of the primary winding or the secondary winding of the transformer thus monitored (see Patent documents 1 and 2).

[Patent Document 1]

Japanese Patent Application Laid-open No. 2004-201474

[Patent Document 2]

Japanese Patent Application Laid-open No. 2005-73483

Here, let us consider a control method for a self-exciting DC/DC converter, in which the currents that flow through the primary winding and the secondary winding of the transformer are monitored. With such an arrangement, the switching transistor is turned on at the timing when the current Ic2 that flows through the secondary winding becomes zero. On the other hand, the switching transistor is turned off at the timing when the current Ic1 that flows through the primary winding reaches a predetermined level Ith1.

With such a control method, a first resistor is connected to the primary winding of the transformer with the electric potential of one end of the first resistor having been set to a fixed value. Also, a second resistor is connected to the secondary winding of the transformer, with the electric potential of one end of the second resistor having been set to a fixed value. With such an arrangement, the currents that flow through the primary winding and the secondary winding are converted into respective voltages. Furthermore, first and second voltage comparators are provided to comparing the voltages thus converted with a first threshold voltage Vth1 and a second threshold voltage Vth2, respectively. With such an arrangement, the ON/OFF state of the switching transistor is controlled according to the outputs from the two voltage comparators.

Here, the upper limit value Ith1 of the current that flows through the primary winding (which will be referred to as the "first primary current Ic1" hereafter) is determined based upon the resistance value of the first resistor R1 and the first threshold voltage Vth, i.e., it can be obtained using the expression $Ith1 = R1 \times Vth1$. Accordingly, irregularities in the resistance value of the first resistor R1 lead to irregularities in the peak value of the first current Ic1. This leads to irregularities in the switching transistor ON-time, which affects the step-up voltage operation. Let us consider an arrangement in which the first resistor R1 is integrally formed on a semiconductor substrate. In particular, such an arrangement exacerbates the aforementioned problem.

SUMMARY OF THE INVENTION

The present invention has been made in view of the aforementioned problem. It is a general purpose of the present invention to provide a self-exciting DC/DC converter having a function of reducing irregularities in the peak current that flows through a switching transistor, and the irregularities in the ON-time and the OFF-time thereof.

An embodiment of the present invention relates to a control circuit for a self-exciting DC/DC converter. The control circuit comprises: a switching transistor connected to the primary coil of a transformer; a first resistor, of which one end is connected to the switching transistor, and of which the other end is grounded; a voltage source which generates a predetermined first threshold voltage; a first voltage comparator which compares a first detection voltage, which occurs at the connection between the first resistor and the switching transistor, with the first threshold voltage; a second voltage comparator which compares a second detection voltage, which corresponds to the current that flows through the secondary coil of the transformer, with a predetermined second threshold voltage; and a switching control unit which controls the ON/OFF state of the switching transistor according to the output signals of the first and second voltage comparators. With such an arrangement, the voltage source has a configuration that allows the first threshold voltage to be adjusted.

Let us consider a case in which there are irregularities in the resistance value of the first resistor. Even in such a case, such an arrangement enables the peak current that flows through the switching transistor, according to which the step-up voltage operation is performed, to be adjusted by adjusting the first threshold voltage. This allows the ON-time of the switching transistor to be adjusted to a desired value.

The above-described control circuit may be integrally formed on a single semiconductor substrate. With such an arrangement, a first electrode pad may be provided to a terminal via which the switching transistor is to be connected to the transformer. Also, a second electrode pad may be provided to a connection that connects the first resistor and the switching transistor. Also, a third electrode pad may be provided to a terminal via which the first resistor is grounded. Also, a fourth electrode pad may be provided to an input terminal of the first voltage comparator, and the input terminal is to be connected to the second electrode pad via an external wiring line.

With such an arrangement, in a testing process for the control circuit, the voltage between the second electrode pad and the third electrode pad is measured while applying the test current in a state in which a constant current source is connected to the first electrode pad, and the switching transistor is set to the ON state. Thus, the resistance value R1 of the first resistor provided between the second electrode pad and the third electrode pad can be obtained based upon the Expression R1=Vtest/Itest, using the voltage value Vtest thus measured and the value of the test current Itest.

Also, the voltage source may have a configuration which allows the first threshold voltage to be adjusted by trimming processing. In a testing process, such an arrangement allows the first threshold voltage to be adjusted according to the resistance value R1 of the first resistor thus measured. This allows the peak current that flows through the switching transistor, according to which the step-up voltage operation is performed, to be adjusted, thereby allowing the ON-time of the switching transistor to be adjusted to a desired value.

Also, the control circuit may further comprise a second resistor which is provided on a path of the current that flows through the secondary coil of the transformer, and of which one end is grounded. With such an arrangement, the second voltage comparator may employ the voltage that occurs at the second resistor as the second detection voltage which is compared with the second threshold voltage.

Also, in a case that the first detection voltage exceeds the first threshold voltage, the switching control unit may turn off the switching transistor. Also, in a case that the second detection voltage exceeds the second threshold voltage, the switching control unit may turn on the switching transistor after a predetermined delay time.

A other embodiment of the present invention relates to a light-emitting device. The light-emitting device comprises: the above-described control circuit; a DC/DC converter output circuit including the transformer which is connected to the control circuit; and a light-emitting element which is driven by the output voltage of the DC/DC converter output circuit. With such an arrangement, the light-emitting element may comprise a xenon tube lamp.

Such an arrangement suppresses irregularities in the peak current that flows through the switching transistor, thereby suppressing irregularities in the ON-time and the OFF-time of the switching transistor. This offers stable operation with respect to the step-up voltage time for the light-emitting element such as a xenon tube lamp that requires high driving voltage of several hundred volts.

Yet another embodiment of the present invention relates to an electronic device. The electronic device comprises: an image capturing unit; and the above-described light-emitting device, which is used as a flash by the image capturing unit for capturing an image. With such an arrangement, the light-emitting device boosts the battery voltage so as to drive the light-emitting element.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

Figure 1:
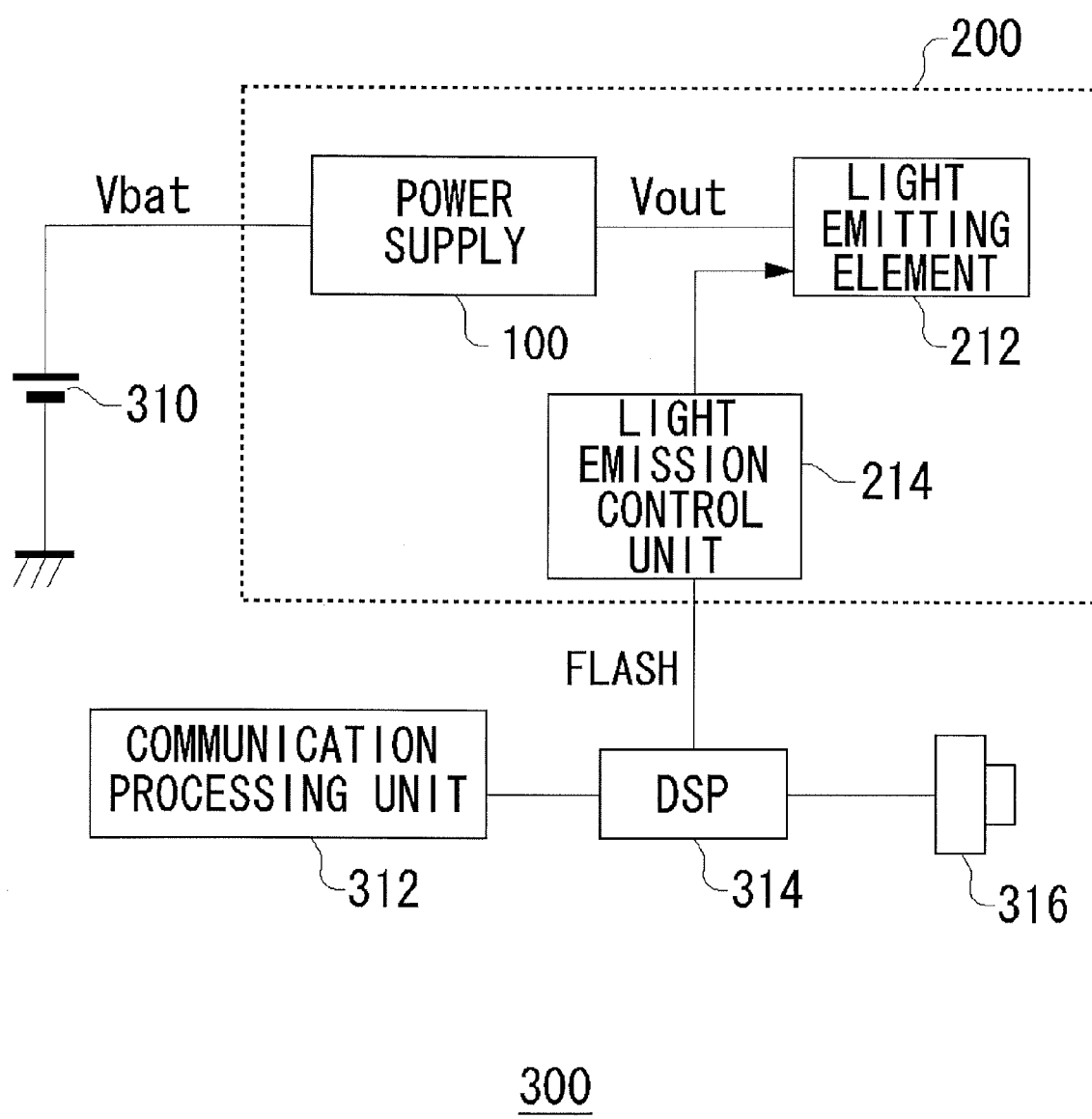
FIG. 1 is a block diagram which shows a configuration of an electronic device mounting a light-emitting device according to an embodiment.

FIG. 1 is a block diagram which shows a configuration of an electronic device 300 mounting a light emitting device 200 according to an embodiment. The electronic device 300 is a cellular phone terminal mounting a camera including: a battery 310; a communication processing unit 312; a DSP (Digital Signal Processor) 314; an image capturing unit 316; and the light emitting device 200.

The battery 310 is a lithium ion battery, for example, and is provided as a power supply for the electronic device 300. The battery 310 supplies a battery voltage of around 3 to 4 V. The DSP 314 is a block for centrally controlling the entire electronic device 300, and is connected to the communication processing unit 312, the image capturing unit 316, and the light emitting device 200. The communication processing unit 312 includes an antenna, a high-frequency circuit, and so forth, and is a block for communicating with a base station. The image capturing unit 316 comprises an image capturing device such as a CCD (Charge Coupled Device), a CMOS sensor, or the like. The light emitting device 200 is a light source used as a flash when the image capturing unit 316 captures an image.

The light emitting device 200 includes a DC/DC converter 210, a light-emitting element 212, and a light emission control circuit 214. A xenon tube or the like is employed as the light-emitting element 212. The DC/DC converter 210 is a self-exciting switching power supply, and is a step-up switching power supply which provides a function of boosting the battery voltage Vbat, supplied from the battery 310, to up to around 300 V. The battery voltage Vbat thus boosted is supplied to the light-emitting element 212 as the driving voltage Vout. The light emission control circuit 214 is a circuit for controlling the timing of light emission of the light emitting device 200.

The DSP 314 outputs a flash signal FLASH to the light emission control circuit 214, synchronous with the timing of the image capture performed by the user. Upon reception of the flash signal FLASH, the light emission control circuit 214 instructs the light-emitting element 212 to emit light.

Figure 2:
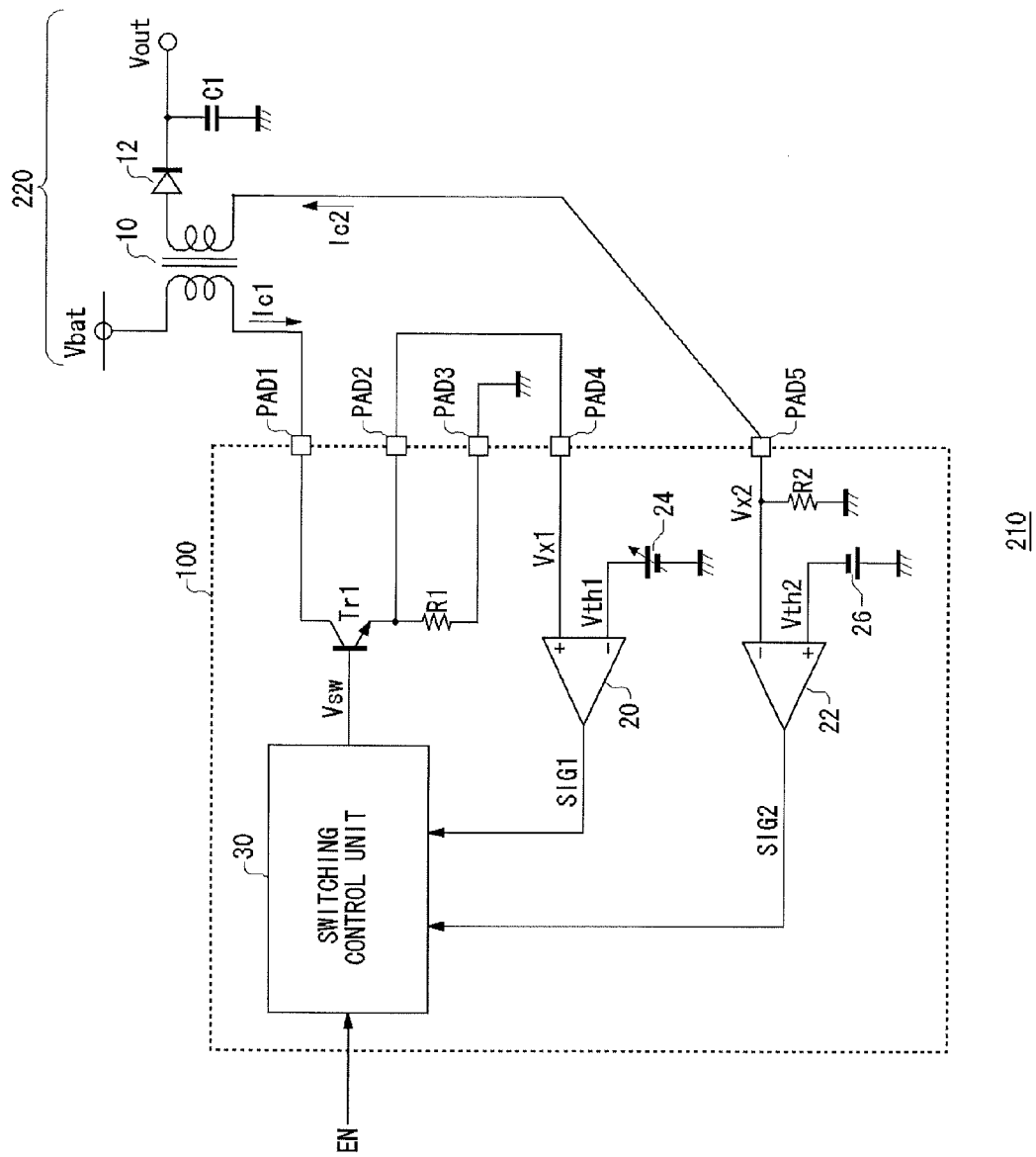
FIG. 2 is a circuit diagram which shows a configuration of a DC/DC converter according to the embodiment.

FIG. 2 is a circuit diagram which shows a configuration of the DC/DC converter 210 according to the present embodiment. The DC/DC converter 210 includes a control circuit 100 and a DC/DC converter output circuit 220. As necessary, in the following description, the reference numerals that denote a voltage signal, a current signal, and a resistor also represent the voltage value, the current value, and the resistance, respectively.

The control circuit 100 is a function IC for driving the DC/DC converter 210, which is integrally formed on a single semiconductor substrate. The control circuit 100 includes a first electrode pad PAD1 through a fifth electrode pad PAD5 for input/output of signals.

The DC/DC converter output circuit 220 includes a transformer 10, a rectifier diode 12, and an output capacitor C1. The battery voltage Vbat is applied to the first terminal of the primary coil of the transformer 10. The second terminal thereof is connected to the first electrode pad PAD1 of the control circuit 100. On the other hand, the first terminal of the secondary coil of the transformer 10 is connected to the anode of the rectifier diode 12. Furthermore, the output capacitor C1 is connected between the cathode of the rectifier diode 12 and the grounded electrode. The second terminal of the secondary coil of the transformer 10 is connected to the fifth electrode pad PAD5 of the control circuit 100.

Next, description will be made regarding the configuration of the control circuit 100. The control circuit 100 includes a switching transistor Tr1, a switching control unit 30, a first voltage comparator 20, a first resistor R1, a second voltage comparator 22, a second resistor R2, a first voltage source 24, and a second voltage source 26.

The switching transistor Tr1 is an NPN bipolar transistor. The collector of the switching transistor Tr1 is connected to the primary coil of the transformer 10 via the first electrode pad PAD1. Also, the switching transistor Tr1 may comprise a MOSFET.

The first resistor R1 is provided on the current path of the current that flows through the primary coil of the transformer 10 (which will be referred to as the "first current Ic1" hereafter). That is to say, the first terminal of the first resistor R1 is connected to the emitter of the switching transistor Tr1. On the other hand, the second terminal thereof is grounded. When the switching transistor Tr1 is turned on, the first current Ic1 flows through the primary coil of the transformer 10, whereupon the first resistor R1 generates the voltage drop (Vx1=Ic1×R1). Note that the voltage at the connection between the first resistor R1 and the switching transistor Tr1 will be referred to as the "first detection voltage Vx1" hereafter.

The first voltage source 24 generates the predetermined first threshold voltage Vth1. As described later, the first voltage source 24 has a configuration that allows the first threshold voltage Vth1 to be adjusted by trimming the first voltage source 24.

The first voltage comparator 20 compares the first detection voltage Vx, which occurs at the connection between the first resistor R1 and the switching transistor Tr1, with the predetermined first threshold voltage Vth1. In a case that Vx1 is greater than Vth1, the first voltage comparator 20 outputs an output signal SIG1 at high level. On the other hand, in a case that Vx1 is smaller than Vth1, the first voltage comparator 20 outputs an output signal SIG1 at low level. As described above, the first detection voltage Vx1 is proportional to the first current Ic1 that flows through the primary coil of the transformer 10. Accordingly, in a case that the first current Ic1 reaches the first threshold current Ith1=Vth1/R1, the output signal SIG1 of the first voltage comparator 20 is set to high level.

The second resistor R2 is provided on the path for the current that flows through the secondary coil of the transformer 10 (which will be referred to as the "second current Ic2" hereafter). That is to say, the second resistor R2 is provided between the fifth electrode pad PAD5 and the grounded terminal. When the second current Ic2 flows through the secondary coil of the transformer 10, the second resistor R2 generates the voltage drop Vx2=Ic2×R2. Note that the voltage at one end of the second resistor R2 will be referred to as the "second detection voltage Vx2" hereafter.

The second voltage source 26 generates the second threshold voltage Vth2, which is set to around 0 V. The second threshold voltage Vth2 is preferably set to the grounded potential, or a negative voltage slightly lower than the grounded potential. The second voltage comparator 22 compares the second detection voltage Vx2, which corresponds to the second current Ic2, with the second voltage Vth2. In a case that Vth2 is greater than Vx2, the second voltage comparator 22 outputs an output signal SIG2 at high level. On the other hand, in a case that Vth2 is smaller than Vx2, the second voltage comparator 22 outputs an output signal SIG2 at low level. That is to say, in a case that the second current Ic2, which flows through the secondary coil of the transformer 10, reaches a second threshold current Ith2=Vth2/R2 ($\cong 0$ A), the output signal SIG2 of the second voltage comparator 22 is set to high level.

The switching control unit 30 performs on/off control for the switching transistor Tr1 according to the output signals SIG1 and SIG2 of the first voltage comparator 20 and the second voltage comparator 22. Furthermore, the switching control unit 30 has a configuration that allows an enable signal EN to be input as an external signal as described later.

With the control circuit 100 according to the present embodiment, the first electrode pad PAD1 is provided to a terminal via which the switching transistor Tr1 and the transformer are to be connected with each other. Also, the second electrode pad PAD2 is provided to a connection that connects the first resistor R1 and the switching transistor Tr1. Also, the third electrode pad PAD3 is provided to a terminal via which the first resistor R1 is to be grounded. Also, the fourth electrode pad PAD4 is provided to an input terminal of the first voltage comparator 20. The input terminal is to be connected to the second electrode pad PAD2 via an external wiring line. Also, the fifth electrode pad PAD5 is provided to a terminal via which the second resistor R2 is to be connected to the secondary coil of the transformer 10.

The second electrode pad PAD2 and the third electrode pad PAD3 are connected with each other via a wiring line external to the control circuit 100. Also, the third electrode pad PAD3 is connected to the external grounded electric potential.

The switching control unit 30 generates a switching signal Vsw based upon the output signals SIG1 and SIG2 of the first voltage comparator 20 and the second voltage comparator 22. The switching signal Vsw is input to the base of the switching transistor Tr1 so as to control the ON/OFF state of the switching transistor Tr1.

In a case that the first detection voltage Vx1 exceeds the first threshold voltage Vth1, i.e., in a case that the first current Ic1 flowing through the primary coil of the transformer 10 reaches the first threshold current Ith1, the switching control unit 30 turns off the switching transistor Tr1.

On the other hand, in a case that the second detection voltage Vx2 exceeds the second threshold voltage Vth2, i.e., in a case that the second current Ic2 flowing through the secondary coil of the transformer 10 reaches the second threshold current Ith2 ($\cong 0$ A), the switching control unit 30 turns on the switching transistor Tr1 after a delay of a predetermined period of time. The switching control unit 30 performs the above-described control operation so as to alternately turn on and off the switching transistor Tr1, thereby boosting the battery voltage Vbat.

Figure 3:
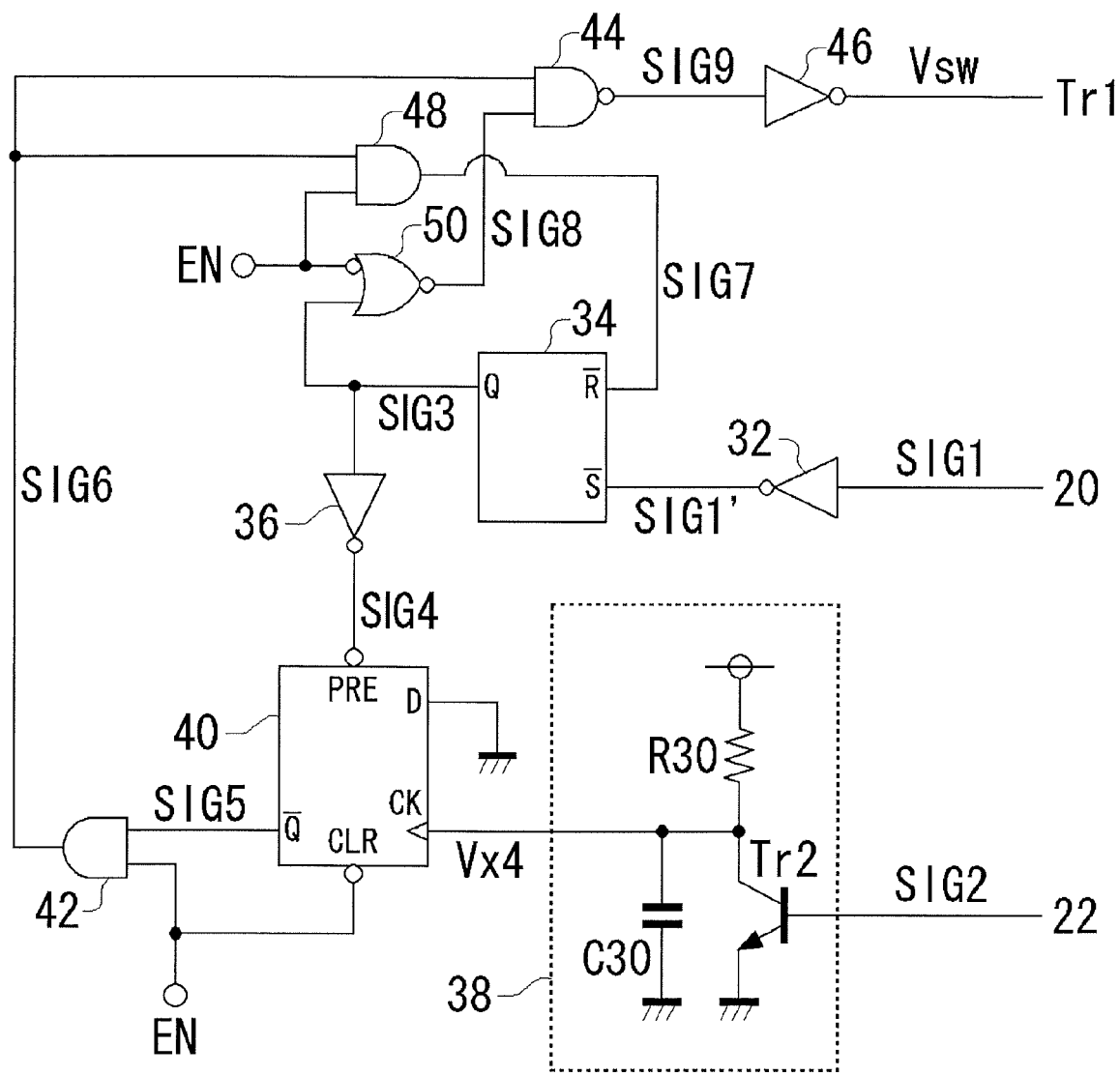
FIG. 3 is a circuit diagram which shows an example of a configuration of a switching control unit.

Next, detailed description will be made regarding an example of the configuration of the switching control unit 30. FIG. 3 is a circuit diagram which shows an example of the configuration of the switching control unit 30.

The output signal SIG1 of the first voltage comparator 20 is inverted by an inverter 32. The output signal SIG1' of the inverter 32 is input to the set terminal (negative logic) of an RS flip-flop 34. The output signal SIG3 of the RS flip-flop 34 is inverted by an inverter 36. The output signal SIG4 of the inverter 36 is input to the preset terminal of a D flip-flop 40. Furthermore, the output signal SIG3 of the RS flip-flop 34 is input to one of the input terminals of a NOR gate 50. The other input terminal of the NOR gate 50 receives as an input signal the enable signal EN, according to which the ON/OFF state of the DC/DC converter 210 is entirely controlled. In a case that the enable signal EN is at high level, the control circuit 100 drives the switching transistor Tr1 so as to perform the voltage step-up operation. The output signal SIG8 of the NOR gate 50 is input to a NAND gate 44.

The switching control unit 30 includes a delay circuit 38 for delaying the output signal SIG2 of the second voltage comparator 22. The switching transistor Tr1 is turned on according to the output of the delay circuit 38.

The delay circuit 38 includes a transistor Tr2, a resistor R30, and a capacitor C30. With regard to the transistor Tr2, the emitter is grounded, and the base is connected to the output of the second voltage comparator 22. The resistor R30 is provided between the collector of the transistor Tr2 and the power supply terminal. The capacitor C30 is provided between the collector terminal of the transistor Tr2 and the grounded terminal. With such an arrangement, in a case that the second detection voltage Vx2 reaches the second threshold voltage Vth2, the output signal SIG2 of the second voltage comparator 22 is set to low level. In this case, the transistor Tr2 is turned off, whereupon the charging of the capacitor C30 is started via the resistor 30. The voltage Vx4 at the one end of the capacitor C30 increases according to the CR time constant.

The voltage Vx4 at one end of the capacitor C30 is input to the clock terminal of the D flip-flop 40. The data terminal of the D flip-flop 40 is grounded, i.e., is set to low level. Furthermore, the enable signal EN is input to the clear terminal (negative logic) of the D flip-flop 40, which allows the control circuit 100 to be initialized each time the voltage step-up operation is started. On the other hand, the output signal SIG4 of the inverter 36 is input to the preset terminal (negative logic) of the D flip-flop 40.

In a case that the output voltage Vx4 of the delay circuit 38, which is input to the clock terminal, has been set to high level during a period when the high level signals are input to the preset terminal and the clear terminal, the D flip-flop 40 outputs the high level signal as an inverted output signal SIG5. On the other hand, in a case that the output of the inverter 36, which is input to the preset terminal, has been switched from high level to low level, the D flip-flop 40 outputs the low level signal as the inverted output signal SIG5.

The inverted output signal SIG5 of the D flip-flop 40 is input to an AND gate 42. The AND gate 42 outputs the AND of the inverted output signal SIG5 of the D flip-flop 40 and the enable signal EN. The output signal SIG6 of the AND gate 42 is input to the NAND gate 44. The NAND gate 44 outputs the NAND of the output signal SIG8 of the NOR gate 50 and the output signal SIG6 of the AND gate 42 to an inverter 46. The inverter 46 inverts the output signal SIG9 of the NAND gate 44. The output signal Vsw output from the inverter 46 is input to the base of the switching transistor Tr1.

The output signal SIG6 of the AND gate 42 and the enable signal EN are input to an AND gate 48. The output signal SIG7 of the AND gate 48 is input to the reset terminal of the RS flip-flop 34.

Figure 4:
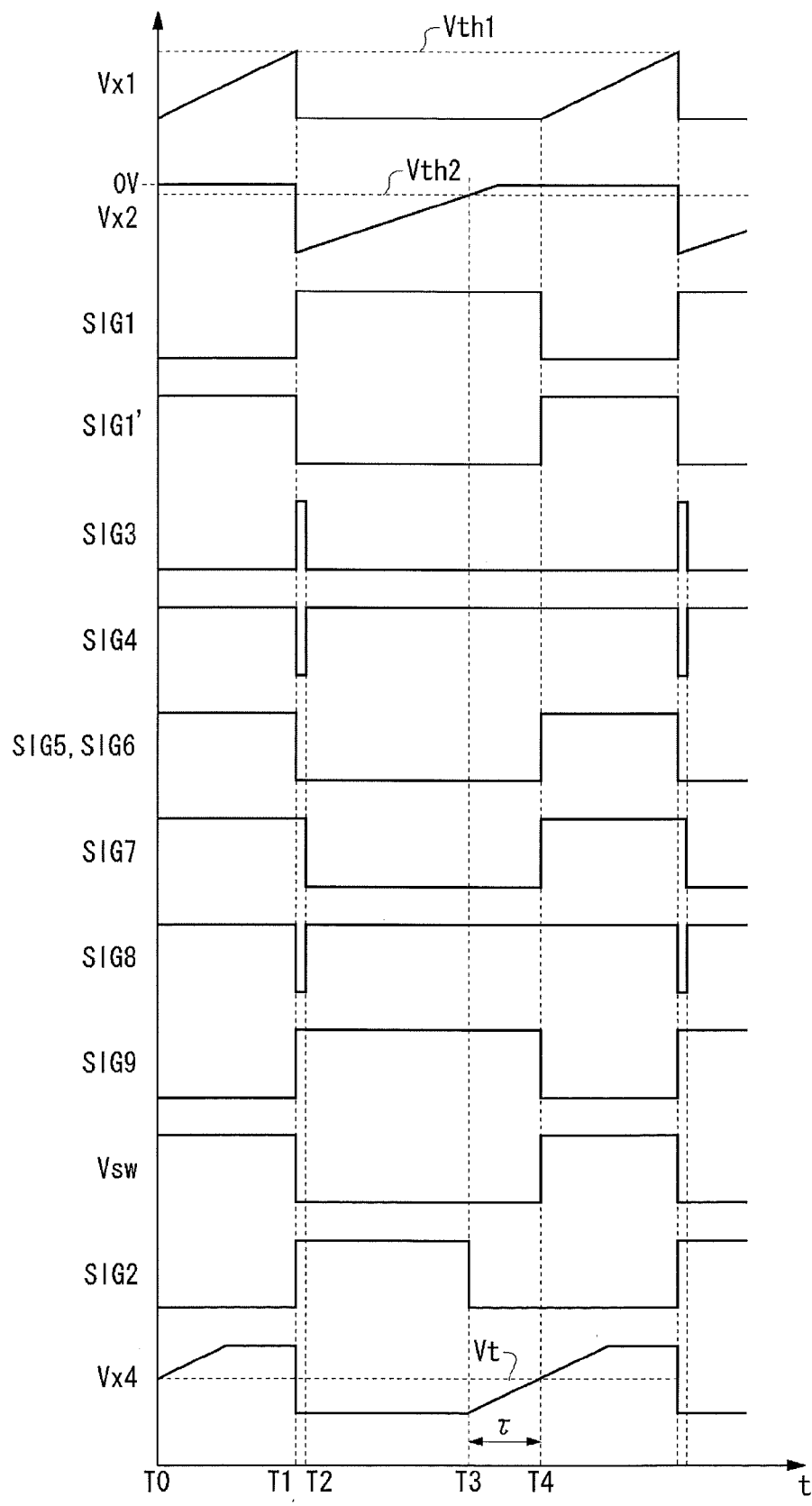
FIG. 4 is a time chart for the step-up voltage operation of a control circuit for the DC/DC converter shown in FIG. 2.

Description will be made regarding the operation of the DC/DC converter 210 having the above-described configuration. FIG. 4 is a time chart for the step-up operation of the DC/DC converter 210 shown in FIG. 2. The signals SIG1 through SIG9 correspond to the signals shown in FIG. 2 and FIG. 3. Let us say that the enable signal EN is set to high level after the point in time T0.

With such an arrangement, the switching signal Vsw is set to high level at the point in time T0, and accordingly, the switching transistor Tr1 is turned on. When the switching transistor Tr1 is turned on as described above, the first current Ic1 that flows through the primary coil of the transformer 10 gradually increases. As a result, the first current Ic1 comes to exceed Vth1 at the point in time T1.

In a case that Vx1 exceeds Vth1, the output signal SIG1 of the first voltage comparator 20 is switched from low level to high level. At the same time, the output signal SIG1' of the inverter 32 is switched from high level to low level. When the signal SIG1' is switched from high level to low level, the RS flip-flop 34 is set such that the output signal SIG3 thereof is set to high level. In a case that the signal SIG3 has been set to high level, the output signal SIG4 of the inverter 36 is set to low level. Accordingly, the D flip-flop 40 is preset such that the inverted output signal SIG5 thereof is set to low level. Now, the enable signal EN is set to high level. Accordingly, the output signal SIG6 of the AND gate 42 exhibits the same logical value as that of the signal SIG5.

When the enable signal EN is at high level, the NOR gate 50 serves as an inverter providing a function of inverting the output signal SIG3 of the RS flip-flop 34. Accordingly, when the output signal SIG3 of the RS flip-flop 34 has been set to high level at the point in time T1, the output signal SIG8 of the NOR gate 50 changes from high level to low level. At the same time, both of the two input signals SIG6 and SIG8 of the NAND gate 44 become low level. Accordingly, the output signal SIG9 of the NAND gate 44 is set to high level. As a result, the switching signal Vsw output from the inverter 46 is set to low level at the point in time T1, thereby turning off the switching transistor Tr1.

When the output signal SIG6 of the AND gate 42 becomes low level at the point in time T1, the output signal SIG7 of the AND gate 48 is set to low level at the point in time T2 after a predetermined delay time that corresponds to several gates from the point in time T1. Note that the other delay factors that are due to the other circuit components will be omitted for simplification of explanation. When the output signal SIG7 of the AND gate 48 changes from high level to low level, the RS flip-flop 34 is reset. As a result, the output signal SIG3 of the RS flip-flop 34 is immediately returned to low level. When the output signal SIG3 of the RS flip-flop 34 becomes low level, the output signal SIG8 of the NOR gate 50 is switched to high level. Furthermore, the output signal SIG4 of the inverter 36, i.e., the signal input to the preset terminal of the D flip-flop 40, is switched to high level.

When the switching transistor Tr1 is turned off at the point in time T1, the second current Ic2 starts to flow through the secondary coil of the transformer 10. The maximum of the second current Ic2 occurs immediately after the switching transistor Tr1 has been turned off. Subsequently, the level of second current Ic2 gradually decreases as the energy stored in the transformer 10 reduces. As a result, with the passage of time, the second detection voltage Vx2 at the second resistor R2 gradually increases from a negative voltage. When the second detection voltage Vx2 reaches the second threshold voltage Vth2, which is slightly lower than 0 V, at the point in time T3, the output signal SIG2 of the second voltage comparator 22 is switched from high level to low level.

When the output signal SIG2 of the second voltage comparator 22 becomes low level at the point in time T3, the output voltage Vx4 of the delay circuit 38 starts to increase according to the time constant. When the output voltage Vx4 of the delay circuit 38, which is input to the clock terminal of the D flip-flop 40, reaches a threshold voltage Vt at the point in time T4 after a delay of τ from the point in time T3, the inverted output signal SIG5 of the D flip-flop 40 is set to high level. When the inverted output signal SIG5 of the D flip-flop 40 is switched to high level, both the output signal SIG6 of the AND gate 42 and the output signal SIG7 of the AND gate 48 are set to high level. When the output signal SIG6 of the AND gate 42 is switched to high level, the output signal SIG9 of the NAND gate 44 is switched to low level. On the other hand, the output signal of the inverter 46, i.e., the switching signal Vsw, is switched to high level, thereby turning on the switching transistor Tr again.

As described above, the control circuit 100 according to the present embodiment monitors the first current Ic1 flowing through the primary coil, and the second current Ic2 flowing through the secondary coil, of the transformer 10, and performs on/off control for the switching transistor Tr1 according to the detection results. The on/off control is performed for the switching transistor Tr1 such that the output capacitor C1 stores the charge, thereby raising the output voltage Vout. After the output voltage Vout has been raised up to a predetermined voltage, the light emission control circuit 214 instructs a xenon lamp, i.e., the light-emitting element 212, to emit light synchronously with the image capturing performed by the image capturing unit 316 shown in FIG. 1.

As described above, the ON time of the switching transistor Tr1 is determined by the period of time required for the first current Ic1 to reach the first threshold current Ith1. Here, the first threshold current Ith1 is represented by the Expression Ith1=Vth1/R1, using the resistance of the first resistor R1 and the threshold voltage Vth1. Accordingly, irregularities in the resistance of the first resistor R1 lead to irregularities in the peak value (Ith1) of the first current Ic1. This leads to irregularities in the ON time of the switching transistor Tr1, which affects the step-up voltage operation.

Figure 5:
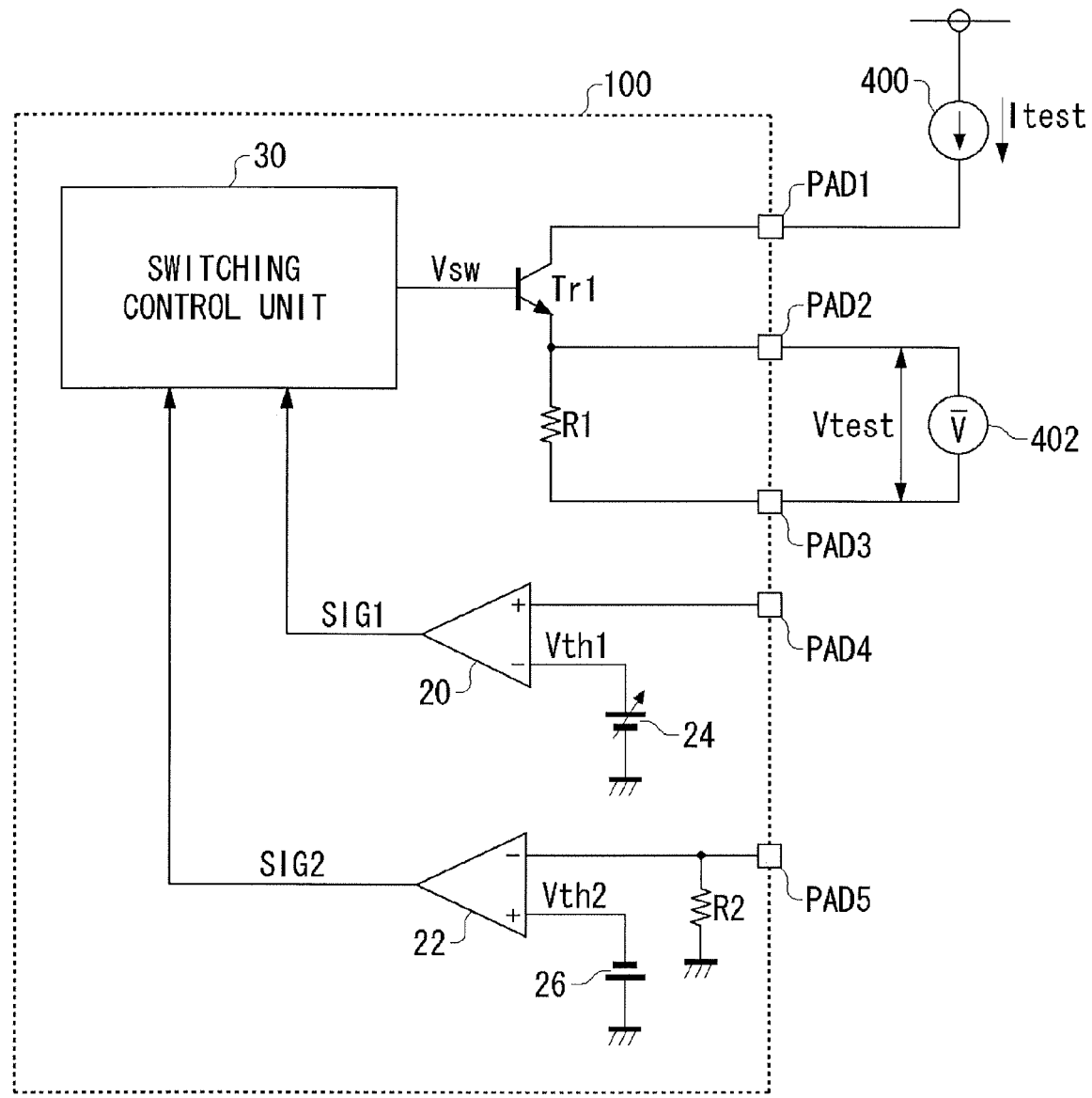
FIG. 5 is a diagram which shows a circuit configuration employed in a testing process for the control circuit shown in FIG. 2.

With the present embodiment, the control circuit 100 is subjected to the following adjustment in a testing process. This suppresses irregularities in the peak value of the first current Ic that flows through the primary winding of the transformer and the switching transistor Tr1. FIG. 5 shows a circuit configuration employed in the testing process for the control circuit 100 shown in FIG. 2.

In the testing process, a current source 400 is connected to the first electrode pad PAD1 of the control circuit 100. Furthermore, a voltmeter 402 is connected between the second electrode pad PAD2 and the third electrode pad PAD3. During the testing process, the switching signal Vsw is set to the high level state, and the switching transistor Tr1 is set to the ON state.

Upon turning on the switching transistor Tr1, the switching transistor Tr1 and the first resistor R1 form a current path. In this state, a predetermined test current Itest is applied to this current path using the current source 400. In this stage, the first resistor R1 generates the voltage drop represented by the Expression R1×Itest. The voltmeter 402 measures the voltage drop across the first resistor R1. The resistance value is obtained by the Expression R1=Vtest/Itest, using the voltage (which will be referred to as the "measured voltage" hereafter) measured by the voltmeter 402.

Furthermore, the first threshold voltage Vth1 generated by the first voltage source 24 is measured. The peak value Ith1' of the current that flows through the primary coil of the transformer 10 and the switching transistor Tr1 is calculated by the Expression Ith1'=Vth1/R1, using the first threshold voltage Vth1 obtained by the measurement and the resistance value of the first resistor R1 obtained based upon the aforementioned Expression.

Next, comparison is made between the peak value Ith1' thus calculated and the design peak value Ith1 of the first current Ic1. Specifically, the difference current ΔI is obtained using the Expression ΔI=Ith1'−Ith1. For example, let us consider a case in which the peak value Ith1' thus calculated is 0.7 A, and the design value Ith1 is 1 A. In this case, the difference current ΔI thus calculated is −0.3 A.

Next, the first threshold voltage Vth1 generated by the first voltage source 24 is adjusted based upon the difference current ΔI thus obtained. Specifically, the first threshold voltage Vth1 is shifted so as to cancel the irregularities in the first resistor R1 or the first threshold voltage Vth1. Here, the adjustment value ΔVth1 of the first threshold voltage Vth1 can be obtained using the Expression ΔVth1=ΔI×R1. Here, R1 represents the resistance value of the first resistor R1 obtained by measurement. Let us consider a case in which the difference current ΔI is −0.3 A, and the resistance value of the first resistor R1 is 100 mΩ. In this case, the adjustment value ΔVth1 of the first threshold voltage Vth1 thus calculated is −30 mV. With such an arrangement, the first threshold voltage Vth1 is shifted by the adjustment amount ΔVth1 thus calculated, whereby the peak current of the first current Ic1 approaches the design value.

In order to provide a function of adjusting the voltage value of the first voltage source 24, an arrangement may be made in which multiple resistors are connected in series, with one end of this series circuit being grounded, and with a reference voltage being applied to the other end thereof. With such an arrangement, the electric potential at a desired node between adjacent resistors is output as the first threshold voltage Vth1. Furthermore, a fuse which can be trimmed is provided in parallel to each predetermined resistor. Such an arrangement allows the first threshold voltage Vth1 to be adjusted by trimming the resistor series circuit, i.e., by breaking the appropriate fuses.

Also, in order to adjust the peak current Ith1, the resistance value of the first resistor R1 may be adjusted. In this case, the adjustment amount of the resistance value of the first resistor R1 is represented by the Expression ΔR1=Vth1/ΔI.

With the present embodiment, the first electrode pad PAD1 through the fourth electrode pad PAD4 are provided. Such an arrangement allows irregularities in the resistance value of the first resistor R1 to be measured in the testing process. Furthermore, such an arrangement allows the peak current Ith1 of the first current Ic1, according to which the step-up voltage operation is performed, to be adjusted to a desired value by adjusting the first threshold voltage Vth1 according to irregularities thus measured in the resistance value of the first resistor R1.

The above-described embodiments have been described for exemplary purposes only, and are by no means intended to be interpreted restrictively. Rather, it can be readily conceived by those skilled in this art that various modifications may be made by making various combinations of the aforementioned components or processes, which are also encompassed in the technical scope of the present invention.

Figure 6:
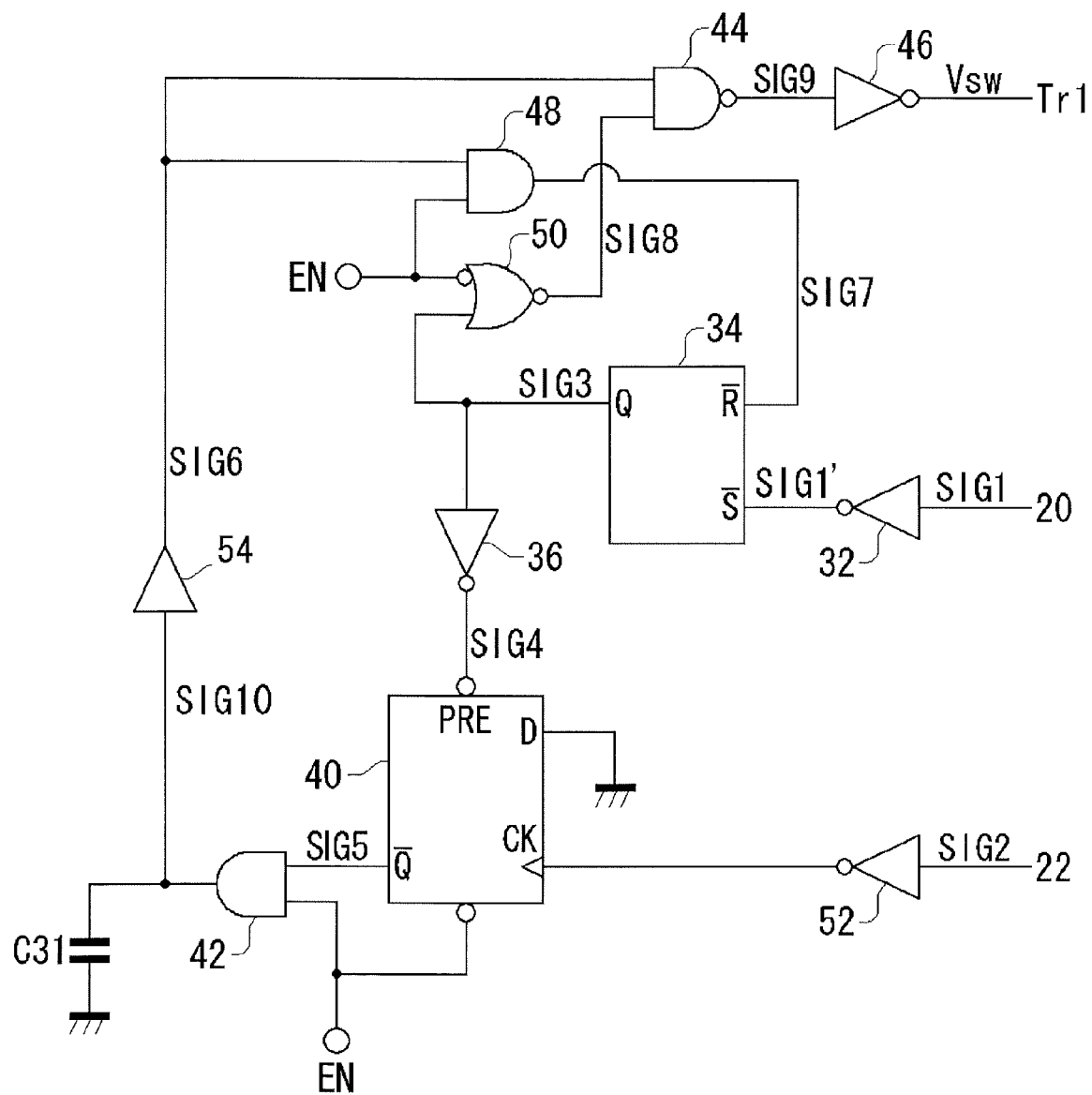
FIG. 6 is a circuit diagram which shows a modification of the switching control unit.

FIG. 6 is a circuit diagram which shows a modification of the switching control unit. A switching control unit 30a shown in FIG. 6 includes an inverter 52 which inverts the output signal SIG2 of the second voltage comparator 22, instead of the delay circuit 38 shown in FIG. 3. Furthermore, a capacitor C31 is provided between the output terminal of the AND gate 42 and the grounded terminal. In FIG. 6, the same or similar components and signals as those shown in FIG. 3 are denoted by the same reference numerals, and description thereof will be omitted as appropriate.

With the switching control unit 30a shown in FIG. 6, the output signal SIG2 of the second voltage comparator 22 is inverted by the inverter 52, and the output signal thus inverted is input to the clock terminal of the D flip-flop 40. With such an arrangement, when the second current Ic2 that flows through the secondary coil of the transformer 10 reaches the threshold current Ith2, the state of the output signal SIG2 of the second voltage comparator 22 transits from the high level state to the low level state. Immediately after this transition, the inverted output signal SIG5 of the D flip-flop 40 is switched to the high level state.

During the period until the next preset is performed for the D flip-flop 40, the D flip-flop 40 maintains the inverted output signal SIG5 at high level. That is to say, the D flip-flop 40 provides a function as a latch circuit which latches the output signal SIG2 of the second voltage comparator 22.

Let us consider a case in which the state of the inverted output signal SIG5 of the D flip-flop 40 transits from the low level state to the high level state. This transition leads to a state transition in the output signal SIG10 of the AND gate 42 from the low level state to the high level state. However, charging of the capacitor C31 is required to effect the transition from the low level state to the high level state. Accordingly, the electric potential of the output signal SIG10 of the AND gate 42 increases with a time constant due to the capacitor C31. The signal SIG10 at the capacitor C31 is output to the NAND gate 44 and the AND gate 48 via the buffer 54. When the electric potential of signal SIG10 at the capacitor C31 reaches a threshold voltage, according to which the low level state and the high level state of a buffer 54 are determined, the output signal SIG9 of the NAND gate 44 changes from the high level state to the low level state. As described above, such an arrangement generates a delay from the change in the output of the D flip-flop 40 up to the change in the output of the NAND gate 44. That is to say, the NAND gate 44, the buffer 54, and the capacitor C31 form a delay circuit.

In some cases, ringing occurs in the current Ic2 that flows through the secondary coil of the transformer 10 around 0 A in the state in which the switching transistor Tr1 is set to the OFF state. The occurrence of such ringing is dependent upon the number of windings in, or the coupling coefficient of, the transformer 10. In such a case, the second detection voltage Vx2 fluctuates around the second threshold voltage Vth2. This leads to a situation in which the output signal SIG2 of the second voltage comparator 22 returns to the high level state again after the output signal SIG2 has once transited from the high level state to the low level state, leading to a problem of an increase in the period of time before the switching transistor Tr1 is switched to the next ON-time state.

However, with the switching control unit 30a shown in FIG. 6, the delay circuit, which comprises the AND gate 42, the buffer 54, and the capacitor C31, is disposed downstream of the D flip-flop 40. Accordingly, after the output signal SIG2 of the second voltage comparator 22 has once transited from the high level state to the low level state, the low level state is latched by the D flip-flop 40. Furthermore, the delay circuit adds a delay time to the inverted output signal SIG5 of the D flip-flop 40. Thus, such an arrangement enables the switching transistor Tr1 to be turned on after a predetermined delay time even if ringing occurs in the second current Ic2 that flows through the secondary coil of the transformer 10.

Various modifications can be conceived for the configurations of the switching control unit 30 and 30a, in addition to the configurations shown in FIG. 3 and FIG. 6. The settings of the logic values such as the high level state and the low level state have been defined in the logic circuits shown in FIG. 3 and FIG. 6 for exemplary purposes only. Also, desired settings may be made for the logic values as appropriate using inverters or the like that invert a logic value.

Also, the switching control units 30 and 30a may have a configuration entirely different from the configurations shown in FIG. 3 and FIG. 6. It is sufficient for the switching control units 30 and 30a to have a configuration which allows the switching transistor Tr1 to be turned on/off according to the output signals SIG1 and SIG2 of the first voltage comparator 20 and the second voltage comparator 22. Also, the switching transistor Tr1 may comprise a MOSFET. Also, the switching transistor may be provided in the form of an external transistor.

Description has been made in the embodiment regarding an arrangement in which the DC/DC converter 210 drives the light-emitting element 212 as a load. However, the present invention is not restricted to such an arrangement. Also, the DC/DC converter 210 may drive various kinds of load circuits that require high voltage.

While the preferred embodiments of the present invention have been described using specific terms, such description is for illustrative purposes only, and it is to be understood that changes and variations may be made without departing from the spirit or scope of the appended claims.

The invention claimed is:

1. A control circuit for a self-exciting DC/DC converter comprising:

a switching transistor connected to the primary coil of a transformer;

a first resistor, of which one end is connected to said switching transistor, and of which the other end is grounded;

a voltage source which generates a predetermined first threshold voltage;

a first voltage comparator which compares a first detection voltage, which occurs at the connection between said first resistor and said switching transistor, with the first threshold voltage;

a second voltage comparator which compares a second detection voltage, which corresponds to the current that flows through the secondary coil of said transformer, with a predetermined second threshold voltage; and a switching control unit which controls the ON/OFF state of said switching transistor according to the output signals of said first and second voltage comparators, wherein said voltage source has a configuration that allows the first threshold voltage to be adjusted, wherein the control circuit is integrally formed on a single semiconductor substrate, and wherein a first electrode pad is provided to a terminal via which said switching transistor is to be connected to said transformer, and wherein a second electrode pad is provided to a connection that connects said first resistor and said switching transistor, and wherein a third electrode pad is provided to a terminal via which said first resistor is grounded, and wherein a fourth electrode pad is provided to an input terminal of said first voltage comparator, the input terminal being connected to said second electrode pad via an external wiring line.

2. A control circuit according to claim 1, wherein said voltage source has a configuration which allows the first threshold voltage to be adjusted by trimming processing.

3. A control circuit according to claim 1, further comprising a second resistor which is provided on a path of the current that flows through the secondary coil of said transformer, and of which one end is grounded, and wherein said second voltage comparator employs the voltage that occurs at said second resistor as the second detection voltage which is compared with the second threshold voltage.

4. A control circuit according to claim 1, wherein, said switching control unit turns off said switching transistor in case that the first detection voltage exceeds the first threshold voltage, and wherein, said switching control unit turns on said switching transistor in a case that the second voltage exceeds the second threshold voltage and a predetermined delay time elapses thereafter.

5. A light-emitting device comprising:
a circuit comprising:
   a switching transistor connected to the primary coil of a transformer;
   a first resistor, of which one end is connected to said switching transistor, and of which the other end is grounded;
   a voltage source which generates a predetermined first threshold voltage;
   a first voltage comparator which compares a first detection voltage, which occurs at the connection between said first resistor and said switching transistor, with the first threshold voltage;
   a second voltage comparator which compares a second detection voltage, which corresponds to the current that flows through the secondary coil of said transformer, with
a predetermined second threshold voltage; and
   a switching control unit which controls the ON/OFF state of said switching transistor according to the output signals of said first and second voltage comparators,
   wherein said voltage source has a configuration that allows the first threshold voltage to be adjusted,
   wherein the control circuit is integrally formed on a single semiconductor substrate,
   and wherein a first electrode pad is provided to a terminal via which said switching transistor is to be connected to said transformer,
   and wherein a second electrode pad is provided to a connection that connects said first resistor and said switching transistor,
   and wherein a third electrode pad is provided to a terminal via which said first resistor is grounded,
   and wherein a fourth electrode pad is provided to an input terminal of said first voltage comparator, the input terminal being connected to said second electrode pad via an external wiring line;
a DC/DC converter output circuit including said transformer which is connected to said control circuit; and
a light-emitting element which is driven by the output voltage of said DC/DC converter output circuit.

6. A light-emitting device according to claim 5, wherein said light-emitting element comprises a xenon tube lamp.

7. An electronic device comprising:
an image capturing unit; and
a light-emitting device, which is used as a flash by said image capturing unit for capturing an image, the light-emitting device comprising:
   a control circuit comprising
      a switching transistor connected to the primary coil of a transformer;
      a first resistor, of which one end is connected to said switching transistor, and of which the other end is grounded;
      a voltage source which generates a predetermined first threshold voltage;
      a first voltage comparator which compares a first detection voltage, which occurs at the connection between said first resistor and said switching transistor, with the first threshold voltage;
      a second voltage comparator which compares a second detection voltage, which corresponds to the current that flows through the secondary coil of said transformer, with a predetermined second threshold voltage; and
      a switching control unit which controls the ON/OFF state of said switching transistor according to the output signals of said first and second voltage comparators,
   wherein said voltage source has a configuration that allows the first threshold voltage to be adjusted,
   wherein the control circuit is integrally formed on a single semiconductor substrate,
   and wherein a first electrode pad is provided to a terminal via which said switching transistor is to be connected to said transformer,
   and wherein a second electrode pad is provided to a connection that connects said first resistor and said switching transistor,
   and wherein a third electrode pad is provided to a terminal via which said first resistor is grounded,
   and wherein a fourth electrode pad is provided to an input terminal of said first voltage comparator, the input terminal being connected to said second electrode pad via an external wiring line;
a DC/DC converter output circuit including said transformer which is connected to said control circuit; and
a light-emitting element which is driven b the output voltage of said DC/DC converter output circuit,
wherein said light-emitting device boosts the battery voltage so as to drive said light-emitting element.

* * * * *